United States Patent
McLeod et al.

(10) Patent No.: US 7,140,767 B2
(45) Date of Patent: Nov. 28, 2006

(54) PROGRAMMABLE IDEALITY FACTOR COMPENSATION IN TEMPERATURE SENSORS

(75) Inventors: Scott C. McLeod, Oro Valley, AZ (US); Thomas R. Anderson, Tucson, AZ (US); Steven Burstein, Smithtown, NY (US); Leonid A. Bekker, Holbrook, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 70 days.

(21) Appl. No.: 10/979,437

(22) Filed: Nov. 2, 2004

(65) Prior Publication Data

US 2006/0093016 A1    May 4, 2006

(51) Int. Cl.
G01K 19/00 (2006.01)
G01K 7/00 (2006.01)

(52) U.S. Cl. .......................................... 374/178; 374/1
(58) Field of Classification Search .................. 374/178
See application file for complete search history.

(56) References Cited

U.S. PATENT DOCUMENTS

| | | | |
|---|---|---|---|
| 3,672,215 A | 6/1972 | Stout et al. | |
| 3,679,992 A | 7/1972 | Yerman | |
| 4,228,684 A | 10/1980 | Templin | |
| 5,195,827 A | 3/1993 | Audy et al. | |
| 5,419,637 A | 5/1995 | Frye et al. | |
| 6,019,508 A * | 2/2000 | Lien ............................ | 374/178 |
| 6,169,442 B1 | 1/2001 | Meehan et al. | |
| 6,554,469 B1 | 4/2003 | Thomson et al. | |
| 6,554,470 B1 | 4/2003 | Zhang et al. | |
| 6,870,357 B1 * | 3/2005 | Falik ............................ | 324/71.5 |
| 2003/0123520 A1 * | 7/2003 | Tesi ............................. | 374/178 |
| 2004/0071183 A1 * | 4/2004 | Tesi et al. ...................... | 374/1 |
| 2006/0039445 A1 * | 2/2006 | McLeod ....................... | 374/178 |

* cited by examiner

*Primary Examiner*—Diego Gutierrez
*Assistant Examiner*—Mirellys Jagan
(74) *Attorney, Agent, or Firm*—Meyertons Hood Kivlin Kowert & Goetzel, P.C.; Jeffrey C. Hood

(57) ABSTRACT

A temperature sensor circuit and system providing accurate readings using a temperature diode whose ideality factor may fall within a determined range. In one set of embodiments a change in diode junction voltage ($\Delta V_{BE}$) proportional to the temperature of the diode is captured and provided to an ADC, which may perform required signal conditioning functions on $\Delta V_{BE}$, and provide a numeric value output corresponding to the temperature of the diode. Errors in the measured temperature that might result from using diodes with ideality factors that differ from an expected ideality factor may be eliminated by programming the system to account for differing ideality factors. The gain of the temperature sensor may be matched to the ideality factor of the temperature diode by using an accurate, highly temperature stable reference voltage of the ADC to set the gain of the temperature measurement system. The reference voltage may have a trim capability to change the gain setting voltage by a digital address comprising a determined number of bits, with the programmable range for the reference voltage corresponding to a determined range of ideality factors.

27 Claims, 3 Drawing Sheets

PROGRAMMABLE IDEALITY FACTOR COMPENSATION IN TEMPERATURE SENSORS

BACKGROUND OF THE INVENTION

1. Field of the Invention

This invention relates generally to the field of integrated circuit design and, more particularly, to the design of temperature sensor and measurement devices.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across one or more PN-junctions, for example a diode or multiple diodes at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change ($\Delta V_{BE}$) in the base-emitter voltage ($V_{BE}$) between the diodes is generally proportional to temperature. (It should be noted that while $V_{BE}$ generally refers to a voltage across the base-emitter junction of a diode-connected transistor and not a voltage across a simple PN-junction diode, for the sake of simplicity, $V_{BE}$ is used herein to refer to the voltage developed across a PN-junction in general.) More specifically, a relationship between $V_{BE}$ and temperature is defined by the equation $$V_{BE} = \eta \frac{kT}{q} \ln \frac{I}{I_s} \quad (1)$$

where $\eta$ is the ideality factor of the PN junction, k is Boltzman's constant, q is the charge of a single electron, T represents absolute temperature, $I_S$ represents saturation current and I represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \eta \frac{kT}{q} \ln(N) \quad (2)$$

where N is a constant representing a pre-selected ratio of the two separate currents that are supplied to the PN junction of the diode.

A typical dynamic range of $\Delta V_{BE}$, however, is small relative to dynamic ranges that are typical of analog-to-digital converters (ADCs). That is, $\Delta V_{BE}$, which is used to measure the PN junction temperature, generally has a small dynamic range, for example on the order of around 60 mV in some systems. Therefore it is generally required to further process $\Delta V_{BE}$ in order to match the dynamic range of ADCs. Typically, in order to obtain the desired conversion values at various temperatures, $\Delta V_{BE}$ is multiplied by a large gain, and then centered to zero, which can be accomplished by subtracting a fixed voltage.

In general, implementations today perform the temperature signal processing (TSP) in a separate temperature sensor circuit that generates a sufficiently large voltage signal, which is fed into a separate ADC that may have been designed using a number of different topologies. Temperature-to-digital converters (TDC) of such implementations usually contain complex circuits. The yield of these TDCs during the fabrication process may also be low as there are many components that need to be matched for a given process spread.

An example of a typical temperature measurement system, which includes an ADC, is illustrated in FIG. 1. A TSP circuit 100 is coupled to an ADC 130. TSP 100 may comprise current sources 104 and 106, where a current provided by 104 is an integer (N) multiple of a current provided by 106, a diode 102, an integration capacitor 126, an offset capacitor 122, a gain capacitor 124, and an operational amplifier (OP-AMP) 120, interconnected as illustrated in FIG. 1. P1 110 and P2 112 represent non-overlapping clocks that provide switching between two circuit configurations as shown. When P1 110 is closed, current source 104 powers TSP 100 and P2 112 is open. Similarly, when P2 112 is closed, current source 106 powers TSP 100 and P1 110 is open. Switching between current sources 104 and 106, different currents are forced through the junction of diode 102 resulting in a change in diode-junction-voltage ($\Delta V_{BE}$). Although omitted in FIG. 1, it should be understood that when either P1 110 or P2 112 is open, the respective uncoupled current source may be shunted to ground. In the circuit configuration shown, voltage sampling occurs when P1 110 is closed, and charge transfer takes place when P2 112 is closed. In other words, during operation, switching from a configuration of P1 110 closed and P2 112 open to a configuration of P1 110 open and P2 112 closed, results in $\Delta V_{BE}$ effectively "pumping" charge to gain capacitor 124, which in turn leads to integration capacitor 126 also receiving a charge. More specifically, opening P1 110 and closing P2 112 results in a value drop of diode-junction-voltage $V_{BE}$, expressed as $\Delta V_{BE}$. Consequently, $\Delta V_{BE}$ appears across the terminals of capacitor 126, in case capacitor 126 is equal in value to capacitor 124. If capacitor 124 is greater in value than capacitor 126, then $\Delta V_{BE}$ will be amplified, or "gained up", hence an amplified value Vtemp 131 will appear at the output of OP-AMP 120. Voffset 132 is subtracted through offset capacitor 122.

Voltage-temperature relationships characterizing TSP 100 may be described by the following equations:

$V\text{temp}=C_T/C_I*\Delta V_{BE}(T)-C_O/C_I*V\text{offset}$, where $C_T/C_I=(ADC \text{ dynamic range})/(\Delta V_{BE}(T\text{max})-\Delta V_{BE}(T\text{min}))$, and $V\text{offset}=(C_T/C_I*\Delta V_{BE}(T\text{max})-(ADC \text{ dynamic range}))*C_I/C_O$.

Tmax and Tmin represent maximum and minimum diode temperatures, respectively. ADC dynamic range indicates a range of valid voltage values required for proper ADC operation.

Temperature measurement systems that employ diodes feature a variety of types of diodes. Some examples are the Prescott processor diode and the 2N3904 discrete diode. Each type of diode typically has its own ideality factor, which may lead to errors in measurements obtained using a temperature sensor in which a particular diode is configured. This problem generally occurs when temperature measurement systems are designed/trimmed for a single diode ideality factor. When using a diode different from one for which such a temperature measurement system was designed, a measurement error may be incurred. Any such error would have to be corrected if an accurate measurement was desired. A typical solution is to add a constant offset to the temperature sensor output. That is, a constant offset is added to an obtained temperature measurement value. This can generally be performed in the temperature sensor itself or in the external processor with which the sensor interfaces. However, this method of correction is error prone as a different ideality factor leads to a non-constant error across measured temperatures. This is due to the fact that the different ideality factor produces a gain error not an offset error. In some cases an offset register may be used to correct for this error.

Generally, as part of offering a solution, temperature sensor manufacturers typically design their devices to work optimally for a unique ideality factor (i.e. the Prescott processor ideality factor, ~1.011) without any capability to adapt to different diodes without having to program in an offset value. Generally, ideality factors can change over process or can be incorrectly specified at the initial time of sensor design and may need to be corrected once the design is complete.

Other corresponding issues related to the prior art will become apparent to one skilled in the art after comparing such prior art with the present invention as described herein.

SUMMARY OF THE INVENTION

In one set of embodiments the invention comprises a system and method for performing temperature monitoring in a digital system by capturing a change in a diode junction voltage ($\Delta V_{BE}$), which is proportional to a temperature of the diode, and using an analog-to-digital converter (ADC) to perform on $\Delta V_{BE}$ required signal conditioning functions with the output of the ADC providing a numeric value corresponding to the temperature of the diode. Errors in the measured temperature that may result from using diodes with ideality factors that differ from the ideality factor for which the temperature measurement device has been primarily configured may be eliminated by programming the device to account for differing ideality factors. In one embodiment this is accomplished by matching the gain of the temperature sensor to the ideality factor of the diode that is used for performing the temperature monitoring.

In one embodiment, matching the gain of the temperature sensor to the ideality factor of the diode is performed by using an accurate, highly temperature stable reference voltage to set the gain of the temperature measurement system. The reference voltage may already have a trim capability to change the gain setting voltage by a digital address comprising a determined number of bits. Each least significant bit (LSB) of the trim word may change a 1.500V reference voltage by ~1.1 mV. The reference voltage value (from 1.46488V to 1.5351V, for example) may be programmed through a coupled bus by an end user, using the trim bits. The programmable sensor may thus be used to accurately measure the temperature of diodes with ideality factors falling within a determined range that corresponds to the reference voltage range, for example within a range of 0.985 to 1.032. This range may be increased to accommodate a broader range of ideality factors, or may be decreased when accommodating a narrower range of ideality factors.

Thus, various embodiments of the invention may provide a means for performing temperature monitoring/measurement by applying a $\Delta V_{BE}$ signal to an ADC that performs signal-processing functions, including matching and centering the voltage range of $\Delta V_{BE}$ to the dynamic range of the ADC, while accommodating a range of ideality factors for different diodes that may be used in the temperature monitoring/measurement system, thus obtaining measurements substantially free of errors that may occur due to the different ideality factors of the different diodes.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
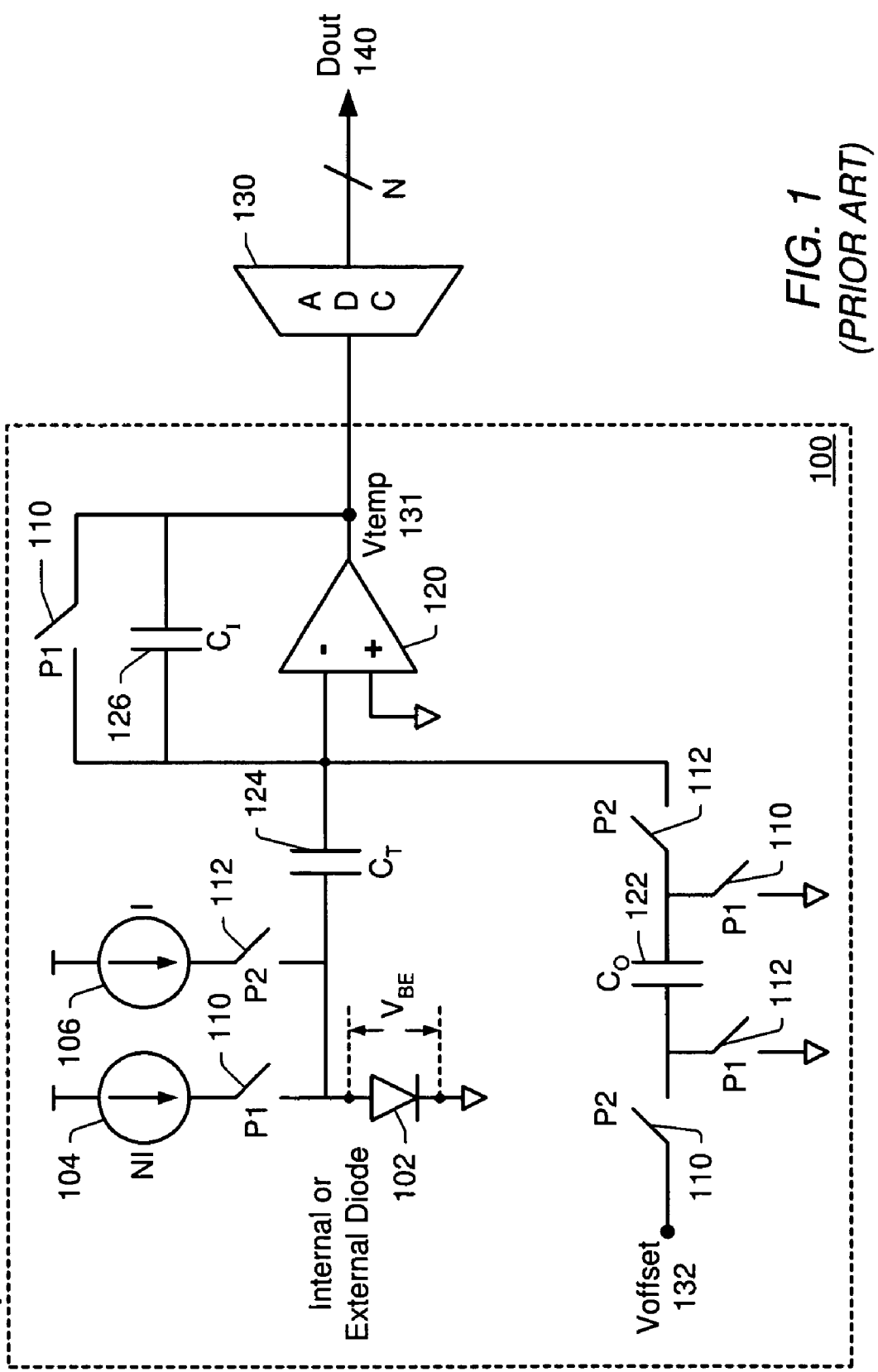
FIG. 1 illustrates a temperature measurement system that utilizes an ADC, in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, the word "alternately" is meant to imply passing back and forth from one state, action, or place to another state, action, or place, respectively. For example, "alternately applying a first current source and a second current source" would mean applying the first current source, then applying the second current source, then applying the first current source, then applying the second current source, and so on.

A "diode-junction-voltage" ($V_{BE}$) refers to a voltage measured across the junction of a diode, or a difference in voltage between a voltage measured at the anode of the diode junction with respect to a common ground and a voltage measured at the cathode of the diode junction with respect to the common ground. A "change in diode-junction-voltage" ($\Delta V_{BE}$) refers to a change in diode-junction-voltage for a chosen diode, either in time or in different circuit configurations. For example, if in one circuit configuration $V_{BE}=700$ mV for a diode, and in a different circuit configuration $V_{BE}=655$ mV for the diode, then $\Delta V_{BE}=45$ mV for the diode when referencing to the two different circuit configurations. Similarly, for example, if at a time point t1 $V_{BE}=650$ mV for a diode, and at a time point t2 $V_{BE}=702$ mV for the diode, then $\Delta V_{BE}=52$ mV for the diode when referencing time points t1 and t2. "Storing" a $V_{BE}$ or $V_{BE}$ value in an integrator generally refers to developing a charge corresponding to the $V_{BE}$ value within the integrator. "Adding" and/or "subtracting" a $V_{BE}$ or $V_{BE}$ value in the integrator generally refers to increasing and/or decreasing the developed charge within the integrator, correspondingly to the $V_{BE}$ value.

A diode is used as one way of accessing a PN-junction across which voltage measurements to obtain $V_{BE}$ may be made. More generally, diode-junction may also mean PN-junction or NP-junction, which defines the physical attributes of the junction selected for obtaining temperature values through performing voltage measurements. Various embodiments of the circuit are described as utilizing a diode. However, in other embodiments, the operation performed by the diode may be achieved using other circuitry, such as a PN-junction (or NP-junction) present in devices other than a diode, for example bipolar junction transistors (BJTs). Therefore, the terms PN-junction, NP-junction, diode, and diode-junction are used interchangeably, and all respective terms associated therewith may be interpreted accordingly.

Figure 2:
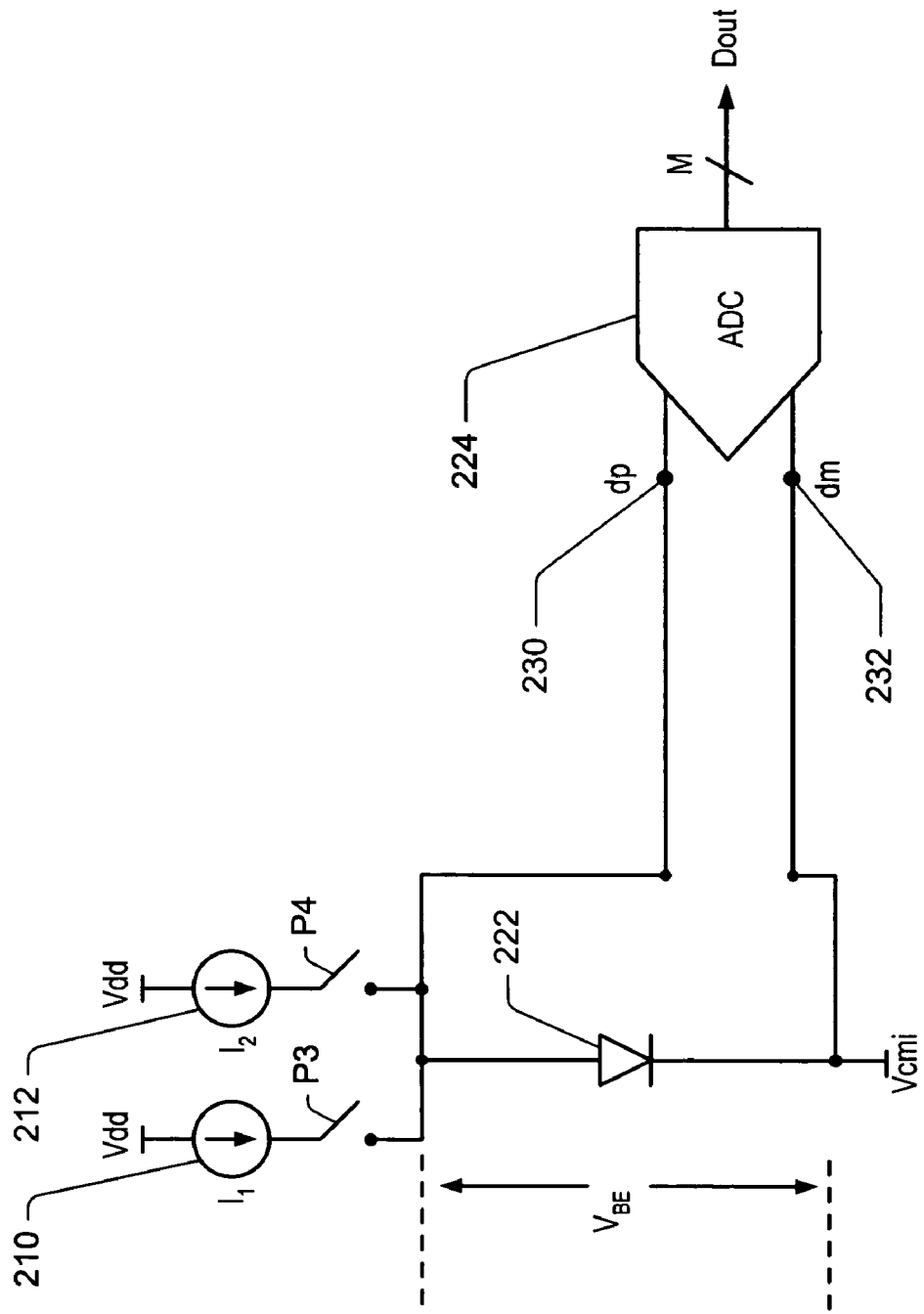
FIG. 2 illustrates one embodiment of a temperature sensor circuit in accordance with the present invention.

FIG. 2 illustrates a block diagram of one embodiment of a temperature sensor circuit implemented in accordance with the present invention. In the embodiment shown, current sources $I_1$ 210 and $I_2$ 212 can be individually coupled to diode 222 via respective switches P3 and P4. Diode 222 may be coupled to the inputs of ADC 224 as shown. For more detail on possible embodiments of ADC 224 and the coupling of diode 222 to ADC 224, please refer to U.S. patent application Ser. No. 10/624,394 titled "Temperature-to-Digital Converter" invented by Troy L. Stockstad and filed on Jul. 22, 2003, which is hereby incorporated by reference in its entirety as though fully and completely set forth herein. One possible way of operating the circuit of FIG. 2 may be by alternately applying $I_1$ 210 and $I_2$ 212 to diode 222, with the resulting $\Delta V_{BE}$ across diode 222 used by ADC 224 to provide a numeric (digital) value corresponding to the temperature of diode 222. ADC 224 may provide an M-bit output, where M may be selected based on the desired resolution of the digital value. In one set of embodiments, the value of $I_1$ may be an N-multiple of the value of $I_2$, as also illustrated in equation (2).

The ideality factor for diode 222 may be expressed in terms of equation (2) as follows:

$$\eta * T = \frac{\Delta V_{BE} * q}{k * \ln(N)}. \tag{3}$$

Equation (3) indicates that as the ideality factor increases the temperature appears to be increasing. For example, assuming an ideality factor of 1.000 for diode 222 when the actual ideality factor of diode 222 was 1.008, the measured temperature of diode 222 would be increased by a factor of 0.008. In other words, the measured temperature of diode 222 would be higher by 0.008T.

In one embodiment, the variability of the temperature measurements due to varying ideality factors is addressed by providing a means for programming the ideality factor value required for diode 222, in order to obtain an accurate temperature measurement. This programmability may be made available for all diodes, including diodes other than diode 222 shown, configured in circuits that are equivalent to the circuit shown in FIG. 2 for obtaining temperature measurements. In one embodiment, the programming of the ideality factor is accomplished by changing the reference voltage for ADC 224. An adjustment to the reference voltage $V_{ref}$ of ADC 224 may be made based on the following relationship:

$$V_{ref\_new} = (\eta_{diode}/\eta_{ADC}) * V_{ref} \tag{4}$$

where $\eta_{diode}$ is the ideality factor of diode 222 (for example, 1.008) and $\eta_{ADC}$ is the ideality factor for which ADC 224 has originally been set (for example, 1.000).

Figure 3:
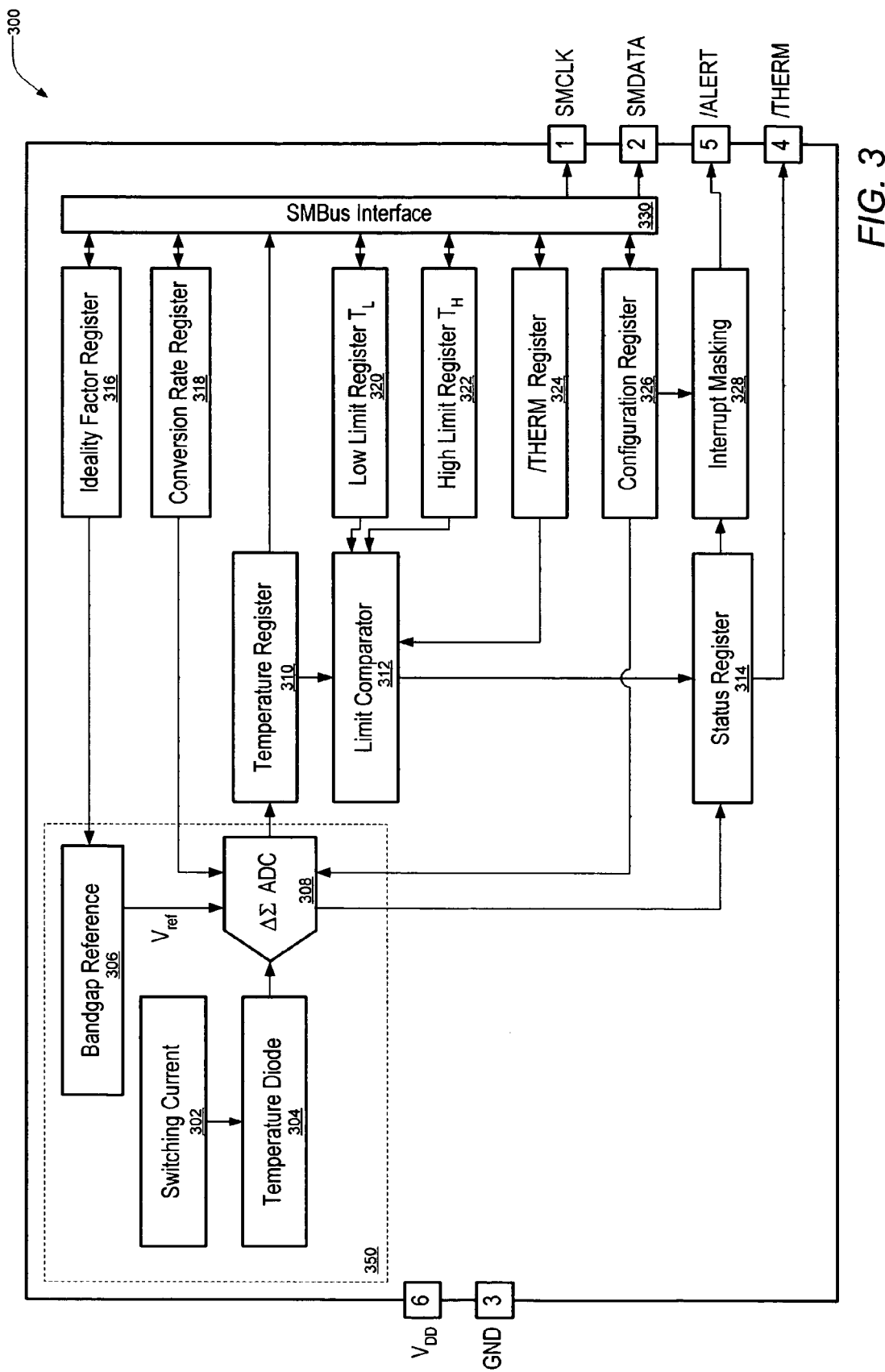
FIG. 3 illustrates one embodiment of a temperature measurement system with a programmable diode ideality factor in accordance with the present invention.

FIG. 3 illustrates the temperature sensor circuit of FIG. 2 configured within a thermal management system 300 in which the temperature sensor circuit is coupled to a bus interface. In FIG. 3, temperature sensor circuit 350 comprises switching current 302, which is provided to temperature diode 304, which is itself coupled to delta-sigma ADC 308. A bandgap reference voltage $V_{ref}$ may be provided to ADC 308 by bandgap reference circuit 306. A set of registers may be configured to store the numeric value of the measured temperature as well as a variety of programmable parameters associated with temperature sensor circuit 350, and the registers may be read and/or written through bus interface 330. In one embodiment, the value of the measured temperature is stored in Temperature Register 310, from which it is transmitted through SMDATA pin 2 via SMBus Interface 330 to a host device that may be coupled to thermal management system 300. As shown in FIG. 3, an Ideality Factor Register 316 may be programmed via SMBus interface 330 to hold a desired ideality factor corresponding to Temperature Diode 304 configured in temperature sensor circuit 350. Bandgap Reference Circuit 306 may be adjusted based on the value of the programmed ideality factor as illustrated by the coupling of Ideality Factor Register 316 to Bandgap Reference Circuit 306, thus setting $V_{ref}$ for ADC 308. It will be apparent to those skilled in the art that a variety of other bus interfaces may be used in lieu of SMBus Interface 330, and other configurations in which the ideality factor may be programmed to adjust the bandgap reference—$V_{ref}$—are possible and may be contemplated. Furthermore, the circuit of FIG. 2 may serve as an embodiment of temperature circuit 350 of FIG. 3, with delta-sigma ADC 308 being an equivalent of ADC 224.

Referring again to FIG. 2, ADC 224 may be a delta-sigma ADC that performs required signal conditioning functions on $\Delta V_{BE}$, where setting $V_{ref}$ may result in a setting of the gain of ADC 224 as well as the offset voltage $V_{offset}$ of ADC 224. The required ADC temperature gain in this embodiment may be expressed as:

$$\text{Temp gain} = \frac{V_{ref}}{\Delta V_{BE(max)} - \Delta V_{BE}(\min)}. \tag{5}$$

As an example, the ratio 'N' between the current provided by current source I1 210 and the current provided by current source I2 212 may be selected to be 17 with a desire to obtain temperature measurements within a range of −64° C. to 191° C. In this case, equation (2) becomes:

$$\Delta V_{BE} = \eta * \frac{kT}{q} * \ln(17). \quad (6)$$

$\Delta V_{BE}$ at 191° C. may be expressed as:

$$\Delta V_{BE}(\max) = \eta * \frac{k*(273.15 + 191)}{q} * \ln(17), \quad (7)$$

where 273.15 is the conversion value required to convert from ° C. to ° K. Equation (7) then leads to the following $\Delta V_{BE}$ value expressed in terms of the ideality factor of diode 222:

$$\Delta V_{BE}(\max) = \eta * 113.32 \text{ mV}. \quad (8)$$

Similarly, $\Delta V_{BE}$ at the minimum temperature −64° C. may be expressed as:

$$\Delta V_{BE}(\min) = \eta * \frac{k*(273.15 - 64)}{q} * \ln(17), \quad (9)$$

resulting in:

$$\Delta V_{BE}(\min) = \eta * 51.06 \text{ mV}. \quad (10)$$

If $V_{ref}$ is originally set to 1.500, substituting the results of equations (8), and (10) into equation (5), the following relationship may be obtained:

$$\text{Temp gain} = \frac{15.00 \text{ V}}{\eta*(113.32 - 51.06)\text{mV}} = \frac{24}{\eta}. \quad (11)$$

The required ADC voltage offset ($V_{os}$) gain may be expressed by:

$$V_{OS} \text{ gain} = \frac{TempGain * \Delta V_{BE}(\min)}{V_{ref}}. \quad (12)$$

Substituting the results from equations (10) and (11), and the selected value of $V_{ref}$ (1.500V) into equation (12), the $V_{os}$ gain becomes:

$$V_{OS} \text{ gain} = \frac{\frac{24}{\eta} * \eta * (51.06 \text{ mV})}{1.500 \text{ V}} = 0.81696. \quad (13)$$

If, for example, ADC 224 is designed for $\eta=1.000$, then it follows from equations (11) and (12) that the Temp Gain=24 and the $V_{os}$ gain=0.81696, respectively.

If a change in the ideality factor can lead to a change in $V_{ref}$ while both the Temp gain and $V_{os}$ gain remain the same, then programming for different ideality factors may be accomplished by trimming only $V_{ref}$. More generally then, from equations (5) and (2), the temperature gain may be expressed in the following equation for a temperature measurement range of $T_{min}$ to $T_{max}$ and a current ratio of 'N':

$$\text{Temp gain} = \frac{V_{ref}}{\eta * \frac{k}{q} * \ln(N) * (T_{\max} - T_{\min})}. \quad (14)$$

If ADC 224 is originally designed for an ideality factor $\eta=1.000$ with corresponding reference voltage value $V_{ref}$ (original) then equation (14) becomes:

$$\text{Temp gain} = \frac{V_{ref}(\text{original})}{\frac{k}{q} * \ln(N) * (T_{\max} - T_{\min})}. \quad (15)$$

It may become readily apparent that substituting $\eta*V_{ref}$ (original) for $V_{ref}$ in equation (14) may lead to equation (15), and thus the value of the temperature gain as expressed in equation (15) becomes independent of $\eta$. In other words, if $V_{ref}$(original) represents a reference voltage value originally assigned to ADC 224 corresponding to an initial ideality factor of $\eta_i=1.000$, then if $\eta$ changes to a different value, changing the reference voltage value to a value of $\eta*V_{ref}$ (original) will result in the temperature gain not changing, as expressed in equation (15).

Similarly, having established that the temperature gain may not change under the conditions as described above, from equations (12) and (2) the voltage offset gain may be expressed generally as:

$$V_{os} \text{ gain} = \frac{TempGain * \eta * \frac{kT}{q} * \ln(N) * T_{\min}}{V_{ref}} \quad (16)$$

where $T_{min}$ is expressed in terms of ° K. Having originally designed ADC 224 for an ideality factor $\eta=1.000$ with corresponding reference voltage value $V_{ref}$(original), equation (16) may be written as:

$$V_{os} \text{ gain} = \frac{TempGain * \frac{kT}{q} * \ln(N) * T_{\min}}{V_{ref}(\text{original})}. \quad (17)$$

Again, it is readily apparent that substituting $\eta*V_{ref}$ (original) for $V_{ref}$ in equation (16) may lead to equation (17), and thus the value of the voltage offset gain as expressed in equation (17) becomes independent of $\eta$. In other words, if $V_{ref}$(original) represents a reference voltage value originally assigned to ADC 224 corresponding to an initial ideality factor of $\eta_i=1.000$, then if $\eta$ changes to a different value, changing the reference voltage value to a value of $\eta*V_{ref}$ (original) will result in the voltage offset gain not changing, as expressed in equation (17). Thus, programming for different ideality factors may be accomplished by trimming only $V_{ref}$.

Turning again to FIG. 3, in one embodiment Ideality Factor Register 316 is a six-bit register used to provide a value to Bandgap Reference 306 to trim $V_{ref}$ in 1.08 mV steps. In this embodiment, by way of example, the minimum value of $V_{ref}$ may be selected to be 1.46646V, and the corresponding maximum value of $V_{ref}$ may be selected to be 1.5344V, with $V_{ref}$(original)=1.5V. Thus the minimum possible ideality factor for Temp Diode 304 may be 1.46646/1.5=0.9776, and the maximum possible ideality factor may be 1.5344/1.5=1.0229. In this embodiment, $V_{ref}$ may be trimmed by programming Ideality Factor Register 316 for ideality factors (of Temp Diode 304) ranging from 0.9776 to 1.0229, thus making temperature sensor circuit 350 more versatile and not confined to operate with diodes of only one particular ideality factor.

Thus, various embodiments of the systems and methods described above may facilitate the design of temperature sensor circuit that uses a temperature diode to obtain temperature measurements, and which may operate accurately for a variety of diodes whose ideality factors fall within a programmable range. Different ideality factors may be user programmable through trimming the reference voltage of an ADC used in obtaining digital temperature measurements from the temperature diode, without changing either the temperature gain or the voltage offset gain.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for monitoring temperature, the method comprising:
   adjusting an operating characteristic of an ADC;
   applying one or more input signals to a device coupled to the ADC, the device having a substantially defined ideality factor and a substantially defined generally non-linear input-output characteristic that varies with temperature, the device producing a sequence of output signals in response to the one or more input signals, wherein each one of the sequence of output signals is generated in response to a respective one of the one or more input signals;
   generating a numeric value corresponding to a temperature of the device in response to the sequence of output signals;
   wherein for a specified range of ideality factors, said adjusting results in the numeric value being substantially free of errors introduced by the ideality factor of the device not matching an expected ideality factor of the specified range of ideality factors.

2. The method of claim 1, wherein the operating characteristic is a reference voltage.

3. The method of claim 1, wherein the ADC is one of:
   a delta-sigma ADC;
   a cyclic ADC;
   a pipeline ADC;
   a successive approximation ADC; and
   an integrating ADC.

4. The method of claim 1, wherein said generating and outputting the numeric value is performed by the ADC.

5. The method of claim 1, wherein said adjusting is performed in response to receiving an ideality factor value corresponding to the operating characteristic.

6. The method of claim 5, wherein the ideality factor value is user programmable during system operation.

7. The method of claim 1, wherein the device comprises a PN-junction.

8. The method of claim 7, wherein the device is one of:
   a diode; and
   a BJT.

9. The method of claim 8, wherein each one of the one or more input signals is an input current, and each one of the sequence of output signals is a base-emitter voltage of the PN-junction.

10. The method of claim 9, wherein each input current is generated by one of a determined number of current sources.

11. A temperature monitoring system comprising:
    an analog-to-digital converter (ADC) configured to receive a reference voltage;
    a semiconductor device coupled to the ADC, wherein the semiconductor device has a substantially defined generally non-linear input-output characteristic that varies with temperature, and wherein the semiconductor device also has a substantially defined ideality factor; and
    one or more input devices;
    wherein the semiconductor device is operable to receive one or more input signals from the one or more input devices, each input signal generated by a respective one of the one or more input devices;
    wherein the semiconductor device is further operable to generate a sequence of output signals and provide the sequence of output signals to the ADC, wherein each one of the sequence of output signals is generated in response to a respective one of the one or more input signals;
    wherein the ADC is operable to produce a numeric value corresponding to a temperature of the semiconductor device, according to the sequence of output signals; and
    wherein for a specified range of ideality factors, the reference voltage is operable to be adjusted such that the numeric value is substantially free of errors introduced by the ideality factor of the semiconductor device not matching an expected ideality factor of the specified range of ideality factors.

12. The system of claim 11, wherein the one or more of input devices comprise one or more current sources, and the input signals comprise input currents.

13. The system of claim 11, wherein the ADC is one of:
    a pipeline ADC;
    a cyclic ADC;
    a delta-sigma ADC;
    a successive approximation ADC; and
    an integrating ADC.

14. The system of claim 11, wherein the ADC comprises an integrating sample-and-hold circuit.

15. The system of claim 11, wherein the semiconductor device comprises a PN-junction.

16. The system of claim 15, wherein the output signal comprises a base-emitter voltage developed across the PN-junction.

17. The system of claim 15, wherein the PN-junction is comprised in one of:
    a diode; and
    a bipolar junction transistor (BJT).

18. The system of claim 11 further comprising a bandgap reference circuit coupled to the ADC, wherein the bandgap reference circuit is configured to provide the reference voltage to the ADC.

19. The system of claim 18 further comprising an ideality factor register coupled to the bandgap reference circuit, wherein the ideality factor register is configured to hold an ideality factor value, and wherein the bandgap reference circuit is operable to adjust the reference voltage based on the ideality factor value.

20. The system of claim 19 further comprising a bus interface coupled to the ideality factor register, wherein the bus interface is operable to couple to a controller, and wherein the ideality factor register is configured to receive the ideality factor value via the bus interface.

21. The system of claim 19, wherein the ideality factor register is user programmable during system operation.

22. A temperature monitoring system comprising:
one or more input devices configured to generate one or more input signals, each input signal generated by a respective one of the one or more input devices;
a semiconductor device, wherein the semiconductor device has a substantially defined generally non-linear input-output characteristic that varies with temperature, and wherein the semiconductor device also has a substantially defined ideality factor, wherein the semiconductor device is operable to receive the one or more input signals and generate a corresponding sequence of output signals therefrom;
an analog-to-digital converter (ADC) coupled to receive the sequence of output signals from the semiconductor device, wherein the ADC is also configured to receive a reference voltage, wherein the ADC is operable to generate and output a numeric value corresponding to a temperature of the semiconductor device, according to the sequence of output signals; and
wherein for a specified range of ideality factors, the reference voltage is operable to be adjusted such that the numeric value is substantially free of errors introduced by the ideality factor of the semiconductor device not matching an expected ideality factor of the specified range of ideality factors.

23. A system comprising:
an analog-to-digital converter (ADC);
a bandgap reference circuit coupled to the ADC, and configured to provide a reference voltage to the ADC;
an ideality factor register coupled to the bandgap reference circuit, and configured to hold an ideality factor value, wherein the bandgap reference circuit is operable to adjust the reference voltage based on the ideality factor value;
a bus interface coupled to the ideality factor register;
PN-junction coupled to the ADC, wherein the PN-junction has a substantially defined generally non-linear input-output characteristic that varies with temperature, and wherein the PN-j unction also has a substantially defined ideality factor; and
one or more current sources coupled to the PN-junction;
wherein the PN-junction is operable to receive one or more input currents from the one or more current sources, each input current generated by a respective one of the one or more current sources;
wherein the ADC is operable to produce a numeric value corresponding to a temperature of the PN-junction, according to the one or more input currents; and
wherein for a specified range of ideality factors, the reference voltage is operable to be adjusted such that the numeric value is substantially free of errors introduced by the ideality factor of the PN-junction not matching an expected ideality factor of the specified range of ideality factors.

24. The system of claim 23, wherein the PN-junction is comprised in one of:
a diode; and
a BJT.

25. The system of claim 23, wherein the ADC is one of:
a pipeline ADC;
a cyclic ADC;
a delta-sigma ADC;
a successive approximation ADC; and
an integrating ADC.

26. A method for monitoring temperature, the method comprising:
programming an ideality factor value corresponding to a PN-junction coupled to an ADC into a register;
adjusting a reference voltage of the ADC according to the ideality factor value;
applying one or more input currents to the PN-junction, the PN-junction having a substantially defined ideality factor and a substantially defined generally non-linear input-output characteristic that varies with temperature, the PN-junction developing a sequence of base-emitter voltages across its terminals in response to the one or more input currents, wherein each one of the sequence of base-emitter voltages is generated in response to a respective one of the one or more input currents;
generating a numeric value corresponding to a temperature of the PN-junction according to the sequence of base-emitter voltages via the ADC;
wherein for a specified range of ideality factors, said adjusting results in the numeric value being substantially free of errors introduced by the ideality factor of the PN-junction not matching an expected ideality factor of the specified range of ideality factors.

27. The method of claim 26, wherein a relationship between the ideality factor value and the reference voltage is determined based on a mathematical equation relating a temperature gain of the PN-junction to:
the reference voltage;
a maximum difference in base-emitter voltage across the terminals of the PN-junction; and
a minimum difference in base-emitter voltage across the terminals of the PN-junction.

* * * * *

UNITED STATES PATENT AND TRADEMARK OFFICE
CERTIFICATE OF CORRECTION

| | | |
|---|---|---|
| PATENT NO. | : 7,140,767 B2 | Page 1 of 1 |
| APPLICATION NO. | : 10/979437 | |
| DATED | : November 28, 2006 | |
| INVENTOR(S) | : McLeod et al. | |

It is certified that error appears in the above-identified patent and that said Letters Patent is hereby corrected as shown below:

Claim 23, Column 11 Line 46, please delete "PN-junction coupled to" and substitute -- a PN-junction coupled to --.

Signed and Sealed this

Twenty-seventh Day of February, 2007

JON W. DUDAS
*Director of the United States Patent and Trademark Office*